Patented Oct. 25, 1932

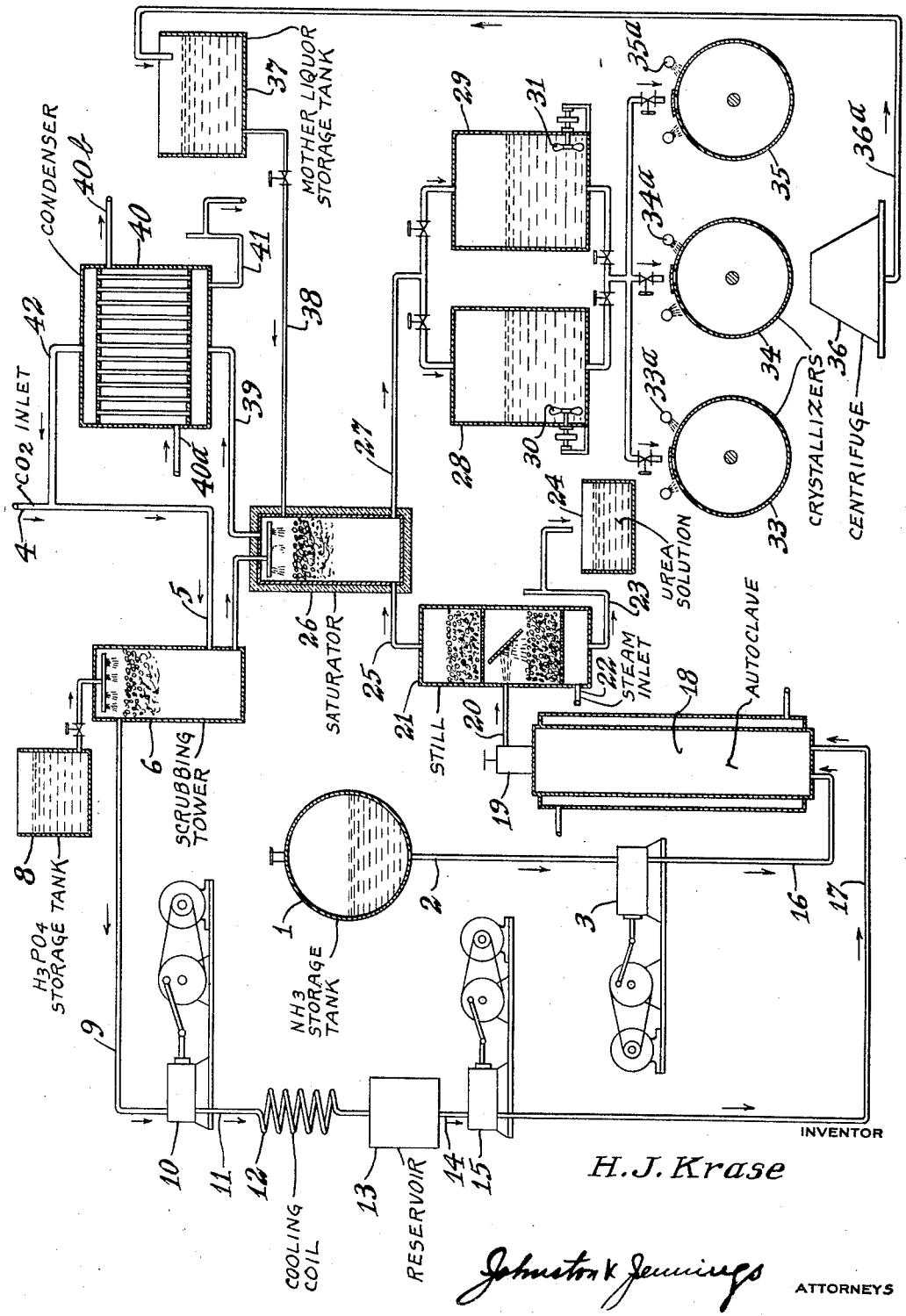

1,884,751

UNITED STATES PATENT OFFICE

HERBERT J. KRASE, OF ANNISTON, ALABAMA, ASSIGNOR, BY MESNE ASSIGNMENTS, TO SWANN RESEARCH, INC., OF BIRMINGHAM, ALABAMA, A CORPORATION OF ALABAMA

PROCESS FOR THE PRODUCTION OF UREA AND AN AMMONIUM SALT OF A STRONG MINERAL ACID

Application filed October 28, 1929. Serial No. 402,949.

This invention relates to the simultaneous manufacture of urea and an ammonium salt, and in particular to a method by which an economic co-ordination of the urea and ammonium salt processes may be combined.

It is the object of this invention to provide a means for economically carrying out the simultaneous production of urea and an ammonium salt from liquid ammonia and gaseous carbon dioxide. A further object is to provide a means whereby the carbon dioxide unconverted to urea may be readily recovered and utilized in the process. These objects are accomplished by the following invention in which I have found that by operating the ammonium salt saturator under substantially atmospheric pressure a greater yield of urea is obtained, and that a practical recovery and utilization of the carbon dioxide can be effected with considerable economy to the operation as a whole.

One method of operating my process is illustrated in the accompanying drawing which is a diagrammatic flow sheet of the materials and apparatus entering into my process. Ammonia in the liquid state is stored in a suitable receptacle 1 and is conveyed by pipe 2 to pump 3. At the same time, substantially pure carbon dioxide gas, which may be saturated with water, enters the system from a suitable source at 4, passes by means of pipe 5 to scrubbing tower 6, wherein it is dried by means of suitably concentrated phosphoric acid flowing from the tank 8 to scrubbing tower 6. The dried carbon dioxide then passes by means of pipe 9 to gas compressor 10, wherein the pressure is raised to the liquefaction pressure. The compressed gas then flows by means of pipe 11 to cooling coil 12, which may be water cooled and in which liquefaction takes place. The liquid carbon dioxide then flows into reservoir 13, from which it flows by means of pipe 14 to pump 15.

Pump 3, pumping liquid ammonia, and pump 15, pumping liquid carbon dioxide, are simultaneously operated at such a rate that the molecular ratio of the respective gases are delivered substantially in the ratio of $2NH_3$ to $1.CO_2$, and conveyed by pipes 16 and 17, respectively, into the urea autoclave 18, in which the reaction to form urea takes place.

The autoclave 18 is a vessel constructed to withstand a pressure of approximately 1800 to 2000 pounds per square inch, is lead lined and of such capacity that a given amount of charge is retained within the vessel for a period of between 1 and 2 hours. The autoclave is also provided with a steam jacket as shown, so that the contents can be heated to the neighborhood of 150° C. When the autoclave is pumped full of charge and further pumping is continued the pressure begins to rise. At this time the discharge valve 19 is opened and the charge flows from the autoclave 18 through pipe 20 and thence into still 21. The venting of the charge from valve 19 is now continuous as long as fresh ammonia and carbon dioxide are pumped into the autoclave by means of pumps 3 and 15, the pressure of the charge being decreased from the autoclave pressure to substantially atmospheric pressure within still 21.

Still 21 is supplied with live steam at 22, the heat of the steam causing dissociation of the ammonia and carbon dioxide compounds accompanying the urea contained in the charge. A solution of urea in water flows from the still base by means of pipe 23 and is stored in tank 24 from whence it may be drawn for evaporation and crystallization as desired. The temperature of the liquid boiling in the base of the still, under substantially atmospheric pressure at the point 22 is in the neighborhood of 104° C., this temperature being sufficient to expel substantially all of the ammonia from the solution without decomposing the urea itself.

The gases expelled from the urea solution consist of a mixture of ammonia, carbon dioxide and water vapor and leave the still by means of pipe 25, said pipe being arranged so that the conveyed gases are not cooled below 60° C. The gases then pass into saturator 26, which is fed with phosphoric acid from dryer 6, which in turn is supplied from tank 8. Within the saturator 26 the ammonia in the gases combines with the phosphoric acid which has been so proportioned as to quantity to form, for example, diammonium phosphate. This is accomplished by proportioning the acid supply so that approximately two molecules of ammonia enter the saturator for every molecule of orthophosphoric acid. Considerable heat is developed in this reaction within saturator 26 which may be thermally insulated so as to utilize as much of the heat as is necessary in the evaporation of the water coming into the system. The solution coming from the saturator 26 flows by means of pipe 27 into either of two adjusting tanks 28 and 29, in which any slight adjustments of the ratio of ammonia to phosphoric acid may be made. These tanks also act as mixers for which purpose they may be supplied with stirring devices 30 and 31. The adjusted solution which is still hot now flows into crystallizers 33, 34 or 35, which may be slowly and gradually cooled by means of water sprays 33a, 34a, and 35a, so that a large, uniform crystal is produced. After cooling to room temperature the crystallizers are discharged and the crystals and mother liquor conveyed by a suitable means not shown to the centrifuge 36, wherein the crystals are freed of mother liquor. The mother liquor is now conveyed by a conveying means 36a to a mother liquor storage tank 37, from which it is gradually returned by means of pipe 38 to be further concentrated by the excess heat in saturator 26.

The steam liberated in saturator 26, together with the carbon dioxide in the gases entering by means of pipe 25 pass out of saturator 26 by means of pipe 39, entering a water cooled condenser 40 having cooling water inlet 40a and outlet 40b. The condensed steam leaves the condenser by means of trap 41 and runs to waste, while the carbon dioxide gas remaining passes by means of pipe 42 into pipe 5, whereby it again passes through the cycle of operations as already indicated. It is obvious that in the operation of my process I may employ other acids than phosphoric, such as sulphuric, or I may make either the mono or diammonium phosphate in the former case. The operation in either case will be substantially similar provided that well known precautions are observed when the operation is varied. In the practice of my invention the further dehydration of the gases in scrubber 6 as described may be dispensed with if the conditions of operation warrant, however the use of dried carbon dioxide is to be preferred since higher yields of urea result.

As an alternative in the use of saturator 26 I have found that I may use a bath type saturator, overcoming the increased head of the liquid in the saturator by a carbon dioxide gas pump inserted in pipe line 42, or if I so desire I may so regulate the rate of inflow of carbon dioxide at point 4 so that the gas pressure in lines 9, 5, 42, 39 and 25 and in scrubbing tower 6, condenser 40, saturator 26 and still 21 is reduced to substantially atmospheric pressure by the suction exerted by means of compressor 10. These however are details which will occur to anyone skilled in the art.

What I claim is:

1. The process of simultaneously producing urea and diammonium phosphate, comprising pumping into a urea converting system liquid ammonia and liquid carbon dioxide in the proportions of substantially two molecules of ammonia to one of carbon dioxide, subjecting this mixture to urea forming temperatures and pressures, separating at substantially atmospheric pressure the converted mixture into an aqueous solution of urea and a gaseous mixture of ammonia and carbon dioxide, combining the ammonia with phosphoric acid in substantially the proportions of two molecules of ammonia to one molecule of phosphoric acid, recovering the carbon dioxide and scrubbing it with the phosphoric acid used for combining with the ammonia, and separately recovering the urea and diammonium phosphate.

2. The process of simultaneously producing urea and diammonium phosphate, comprising subjecting gaseous carbon dioxide to the dehydrating action of concentrated phosphoric acid, liquefying said dehydrated carbon dioxide, pumping into a urea converting system liquid ammonia and said dehydrated liquefied carbon dioxide in the proportion of substantially two molecules of ammonia to one of carbon dioxide, subjecting the mixture to urea forming temperatures and pressures, separating at substantially atmospheric pressure by the direct application of steam the converted mixture into an aqueous solution of urea and a gaseous mixture of ammonia and carbon dioxide, combining the ammonia with the phosphoric acid previously used in dehydrating the carbon dioxide, in substantially the proportions of two molecules of ammonia to one molecule of phosphoric acid, recovering and reprocessing the carbon dioxide, and separately recovering the urea and diammonium phosphate.

3. In a process of producing urea, autoclaving liquefied carbon dioxide and liquefied ammonia under super atmospheric pressure to produce a mixture of urea, unreacted carbon dioxide and ammonia, distilling the ammonia and carbon dioxide from the urea at atmospheric pressure by the direct application of steam to the urea, removing the distilled ammonia from the ammonia and carbon dioxide mixture by combination with phosphoric acid, and separately removing steam from the distilled carbon dioxide by condensation.

4. A combined process for the production of ammonium phosphate and urea which consists in autoclaving liquefied carbon dioxide and liquefied ammonia under super atmospheric pressure to form urea and unreacted carbon dioxide and ammonia, distilling off the carbon dioxide and ammonia, from the urea at atmospheric pressure by the direct application of steam, removing the distilled ammonia from the mixture of carbon dioxide and ammonia by reacting with phosphoric acid to form ammonium phosphate, condensing water from the distilled carbon dioxide, and scrubbing the distilled carbon dioxide with the phosphoric acid later utilized in removing the ammonia.

In testimony whereof I affix my signature.

HERBERT J. KRASE.